United States Patent
Bertocchi

(10) Patent No.: US 12,178,232 B2
(45) Date of Patent: Dec. 31, 2024

(54) MACHINE FOR EXTRACTING PUREE, OR JUICE, FROM FOOD PRODUCTS OF VEGETABLE ORIGIN AND RELATED PRODUCTION METHOD

(71) Applicant: Alessandro Bertocchi, Parma (IT)

(72) Inventor: Alessandro Bertocchi, Parma (IT)

(*) Notice: Subject to any disclaimer, the term of this patent is extended or adjusted under 35 U.S.C. 154(b) by 699 days.

(21) Appl. No.: 17/433,915

(22) PCT Filed: Mar. 3, 2020

(86) PCT No.: PCT/IB2020/051787
§ 371 (c)(1),
(2) Date: Aug. 25, 2021

(87) PCT Pub. No.: WO2020/178727
PCT Pub. Date: Sep. 10, 2020

(65) Prior Publication Data
US 2022/0160014 A1    May 26, 2022

(30) Foreign Application Priority Data
Mar. 7, 2019 (IT) .................. 102019000003313

(51) Int. Cl.
*A23N 1/02* (2006.01)
*A23L 2/04* (2006.01)

(52) U.S. Cl.
CPC .................. *A23N 1/02* (2013.01); *A23L 2/04* (2013.01); *A23V 2002/00* (2013.01)

(58) Field of Classification Search
CPC .......... A23N 1/02; A23L 2/04; A23V 2002/00
See application file for complete search history.

(56) References Cited

U.S. PATENT DOCUMENTS

| | | |
|---|---|---|
| 4,643,085 A | 2/1987 | Bertocchi |
| 5,598,772 A | 2/1997 | Catelli |

FOREIGN PATENT DOCUMENTS

| | | |
|---|---|---|
| WO | 2005/039308 A2 | 5/2005 |
| WO | 2009/063309 A2 | 5/2009 |

*Primary Examiner* — Walter D. Griffin
*Assistant Examiner* — Shuyi S. Liu
(74) *Attorney, Agent, or Firm* — Maschoff Brennan

(57) ABSTRACT

A machine for extracting puree, or juice, from a food product of vegetable origin comprises a hollow body having a longitudinal axis and an inlet for introducing the food product. In the hollow body a first extraction section and a second extraction section are provided both having, respectively, a sieve and a rotor coaxially positioned within the sieve and having a plurality of blades. The rotors are caused to rotate by a respective driving group in order to subject the treated product to a centrifugal force. In this way, in the first extraction section the division of the product is caused in a first portion, which passes through the sieve, and in a second portion, which does not pass through the sieve and advance along the hollow body up to reach a passage section and, therefore, to enter in the second extraction section.

16 Claims, 10 Drawing Sheets

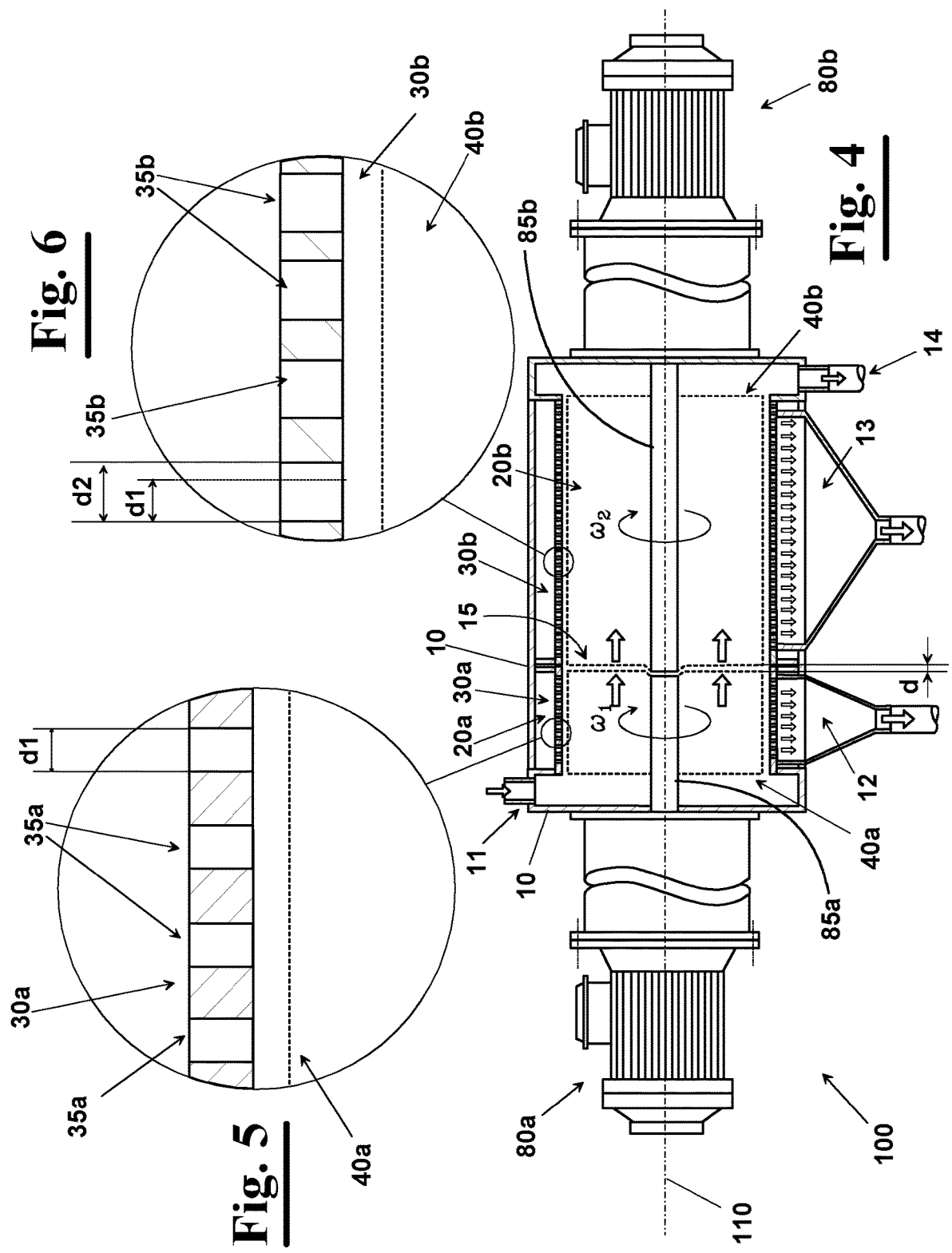

MACHINE FOR EXTRACTING PUREE, OR JUICE, FROM FOOD PRODUCTS OF VEGETABLE ORIGIN AND RELATED PRODUCTION METHOD

FIELD OF THE INVENTION

The present invention relates to a machine for the food industry, and, in particular, it relates to a machine for extracting puree, or juice, from food product of vegetable origin.

Furthermore, the invention relates to a method for extracting puree and juice from food products of vegetable origin.

BACKGROUND OF THE INVENTION

As well known, the industrial extraction of juice and puree, mainly from products of vegetable origin, such as fruit and vegetables, but also from animal products, such as meat and fish, is carried out by means of rotating machines, such as rough extraction machines and finishing extraction machines.

The rotating machines of prior art comprise, in particular, a rotor which is caused to rotate quickly about a rotation axis by a driving group. More precisely, the rotor is peripherally equipped with a series of blades and is mounted within a perforated wall, or sieve, having cylindrical or conical shape. During its rotation about the rotation axis, the rotor applies a centrifugal force to the treated product that causes it to selectively pass through the sieve.

In this way, the part of the product to be used, i.e. the main product containing the puree and the juice, is filtered through the holes of the sieve, conveyed and discharged through a first outlet in order to be, then, subjected to further treatments, whereas the part to be discarded containing, mainly, the skin and the seeds, axially advance and is discharged through a second outlet.

Plants are also known for producing puree, or juice, from vegetable products providing a determined number of extraction machines, as above described, arranged in series. More in detail, if the waste product obtained from the extraction machine positioned upstream is still rich of fractions of pulp, and, therefore, has some value on the market, it is sent to an extraction machine arranged downstream in order to carry out an additional extraction for dividing a good product from a waste product.

A first disadvantage of these kinds of plants is that the passage of the waste product from the extraction machine arranged upstream to the extraction machine arranged downstream is carried out by long ducts and using one, or more pumps. Therefore, the waste product, in particular owing to the heavy parts constituted by pits, during the passage from the machine arranged upstream to the machine arranged downstream, hit against the walls of the machine, the pumps, and the ducts, that are used, unavoidably deteriorate. Furthermore, since the passage from a machine to another one is usually carried out, as above disclosed, by one, or more pumps, the waste product obtained in the extraction machine arranged upstream is stopped for a long time within the pumps and the ducts, and, therefore, oxidation and deterioration of the same occur. Furthermore, the waste product obtained in the machine arranged upstream arrives at the machine arranged downstream at a slow speed, but is suddenly accelerated by the rotor of the machine arranged downstream up to reach the tangential speed of the same, that is normally very high, in order to assure to have good yields. Also this change of speed of the product occurring during the passage from a machine to another one contribute, unavoidably, to deteriorate the product.

Machine are also known that downstream of the extraction section provides a treatment section of the kind described in EP0511174. This provides, in particular, a cylindrical, or conical, rotor, providing blades and arranged to rotate, operated by a respective motor, within a fixed stator of cylindrical, or conical shape. Moe precisely, the rotor and the stator define two shaped walls having a series of protrusions and a series of recesses alternating to each other. The two walls delimit an interspace within which the product to be treated is subjected to a series of pulses in quick succession. The product so treated is, therefore, softened and simplify the following extraction of juice and pulp that is carried out in the extraction section.

Another machine of this kind is described, for example, in WO2005/039308. In this case, the softening section and the extraction section are coaxial to each other. In other cases, instead, as for example in WO2009/063309, the softening section is positioned above the extraction section.

An example of a particular solution of a machine for extracting puree, or juice, from food products is described in U.S. Pat. No. 4,643,085. Also in this case, a hollow body is provided within which only one sieve having holes is arranged and only one rotor positioned within the sieve and configured to produce on the treated product a determined centrifugal force causing a portion of product, comprising the puree and the juice, to pass through the holes of the sieve, and then to be discharged from the hollow body through a first outlet, whilst another portion of the product, which comprises the skins and the seeds, does not pass through the aforementioned holes and is discharged from the hollow body through a second outlet arranged downstream of the first outlet. The particularity of the machine described in U.S. Pat. No. 4,643,085 is that the rotor provides a series of blades that are inclined of an angle greater than 90 degree with respect to a plane tangential to the sieve.

Another kind of machine for extracting puree and juice from food products is described in U.S. Pat. No. 5,598,772. In this case, a rotor is provided positioned within a sieve comprising a first portion, closer to the inlet of the product, having holes with greater diameter, and a second portion, closer to the outlet of the product from the machine, having holes with smaller diameter. Furthermore, scraping elements are provided to remove the parts of the product adhering to the external surface of the sieve.

SUMMARY OF THE INVENTION

It is, therefore, an object of the present invention to provide a machine for extracting puree, or juice, that is able to overcome the disadvantages of the prior art machines.

It is, in particular, an object of the present invention to provide a machine for extracting puree, or juice, which provides to subject the waste product obtained from a first extraction to a following extraction, that is able to avoid the deterioration, or anyway the alteration, of the waste product.

It is also an object of the present invention to provide a method for extracting puree, or juice having analogous advantages.

These and other objects are achieved by the machine for extracting puree, or juice, from a food product of vegetable origin, said machine comprising:

a hollow body having a longitudinal axis and an inlet for introducing said food product of vegetable origin, in said hollow body being provided:
a first extraction section comprising:

a first sieve positioned in said hollow body and having a first plurality of holes;
a first rotor coaxially positioned within said first sieve and having a first plurality of blades;
a first driving group operatively connected to said first rotor by a first motor shaft and configured to cause said first rotor to rotate within said first sieve to apply a centrifugal force to the product to be treated in order to divide said product to be treated in a first portion, which passes through said first plurality of holes of said first sieve and is discharged through a first outlet and in a second portion, which, instead, does not pass through said first plurality of holes of said first sieve and advances axially along said hollow body up to reach a passage section;
a second extraction section positioned downstream of said first extraction section and of said passage section, said second extraction section being provided of:
a second sieve positioned in said hollow body and having a second plurality of holes;
a second rotor coaxially positioned within said second sieve and having a second plurality of blades;
a second driving group operatively connected to said second driving group by a second motor shaft and configured to cause said second rotor to rotate within said second sieve to apply a centrifugal force a said second portion of said product coming from said first extraction section, in such a way to divide said second portion of said product in un main product, which passes through said second plurality of holes of said second sieve and is discharged through a second outlet and in a waste product, which, instead, does not pass through said second plurality of holes of said second sieve and is discharged through a third outlet;
whose man characteristic is that said first plurality of blades of said first rotor and said second plurality of blades of said second rotor are positioned at a predetermined distance d from each other less than 500 mm, in such a way that the second portion of the aforementioned product is arranged to move in the second extraction section without being deteriorated, and, at the same time, without damaging the machine.

Further technical characteristics of the present invention and related embodiments are set out in the dependent claims.

According to another aspect of the invention, a machine for extracting puree, or juice, from a food product of vegetable origin, said machine comprising:
a hollow body having a longitudinal axis and an inlet for introducing said food product of vegetable origin, in said hollow body being provided:
a first extraction section comprising:
a first sieve positioned within said hollow body, said first sieve having a first plurality of holes;
a first rotor coaxially positioned within said first sieve and having a first plurality of blades;
a first driving group operatively connected to said first rotor by a first motor shaft and configured to cause said first rotor to rotate within said first sieve to apply a centrifugal force to the product to be treated in order to divide said product to be treated in a first portion, which passes through said first plurality of holes of said first sieve and is discharged through a first outlet and in a second portion, which, instead, does not pass through said first plurality of holes of said first sieve and advances axially along said hollow body up to reach an interposition chamber;
a second extraction section positioned downstream of said first extraction section and of said interposition chamber, said second extraction section being provided with:
a second sieve positioned within said hollow body and having a second plurality of holes;
a second rotor coaxially positioned within said second sieve and having a second plurality of blades;
a second driving group operatively connected to said second driving group by a second motor shaft and configured to cause said second rotor to rotate within said second sieve to apply a centrifugal force to said second portion of said product coming from said first extraction section, in such a way to divide said first portion of said product in un main product, which passes through said second plurality of holes of said second sieve and is discharged through a second outlet and in a waste product, which, instead, does not pass through said second plurality of holes of said second sieve and is discharged through a third outlet;
whose main characteristic is that the first and the second rotor are configured in such a way that the first rotor is arranged to rotate at a first speed of rotation $\omega 1$ and the second rotor is arranged to rotate at a second speed of rotation $\omega 2$, con $\omega 2 > \omega 1$, whereby the second portion of the product easily moves from a free end of the first plurality of blades to a free end of the second plurality of blades.

According to a further aspect of the invention, a method for extracting puree, or juice, from a food product of vegetable origin, said method comprising the steps of:
feeding said food product of vegetable origin within a first extraction section through an inlet;
extracting said food product of vegetable origin in said first extraction section obtaining a first portion of said product and a second portion of said product, in said first extraction section being provided:
a first sieve having a first plurality of holes;
a first rotor coaxially positioned within said first sieve and having a first plurality of blades;
a first driving group operatively connected to said first rotor by a first motor shaft and configured to cause said first rotor to rotate within said first sieve to apply a centrifugal force to the product to be treated in order to divide said product to be treated in said first portion of said product which passes through said first plurality of holes of said first sieve and in said second portion of said product, which, instead, does not pass through said first plurality of said first sieve;
discharging said first portion of said product through a first outlet;
advancing of said second portion of said product along a direction axial to said hollow body up to reach a passage section positioned downstream of said first extraction section;
feeding said second portion of said product da said passage section in a second extraction section;
extracting said second portion of said product in said second extraction section obtaining a main product and a waste product, in said second extraction section being provided:
a second sieve having a second plurality of holes;
a second rotor coaxially positioned within said second sieve and having a second plurality of blades;
a second driving group operatively connected to said second driving group by a second motor shaft and configured to cause said second rotor to rotate within said second sieve to apply a centrifugal force to the second portion of said product coming from said first extraction section, in such a way to divide said second portion of said product in a main product, which passes through said second plurality of said second sieve;

discharging said main product through a second outlet;

discharging said waste product through a third outlet;

whose main characteristic is that said first plurality of blades of said first rotor and said second plurality of blades of said second rotor are positioned at a predetermined distance d from each other less than 500 mm.

BRIEF DESCRIPTION OF THE DRAWINGS

The invention will be now illustrated with the following description of an exemplary embodiment thereof, exemplifying but not limitative, with reference to the attached drawings wherein:

FIG. 4 diagrammatically shows an elevational side view partially sectioned of a further alternative embodiment of the machine for extracting puree and juice from a product of vegetable origin of FIG. 1;

FIGS. 5 and 6 diagrammatically show, respectively, an enlargement of a part of the first extraction section and of the second extraction section of the machine of FIG. 4, in order to highlight some details of the same;

Figure 10:
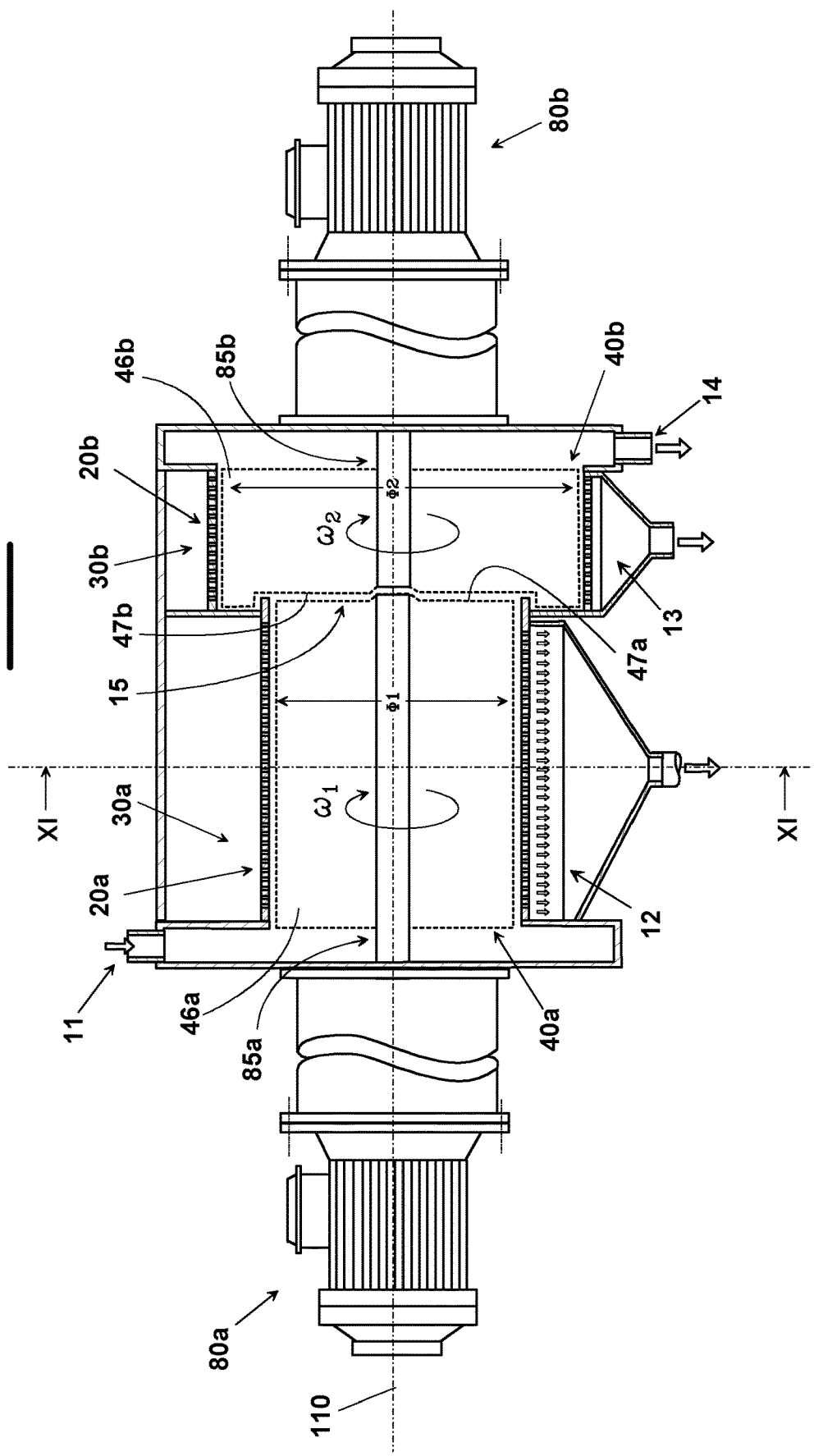
Figure 11:
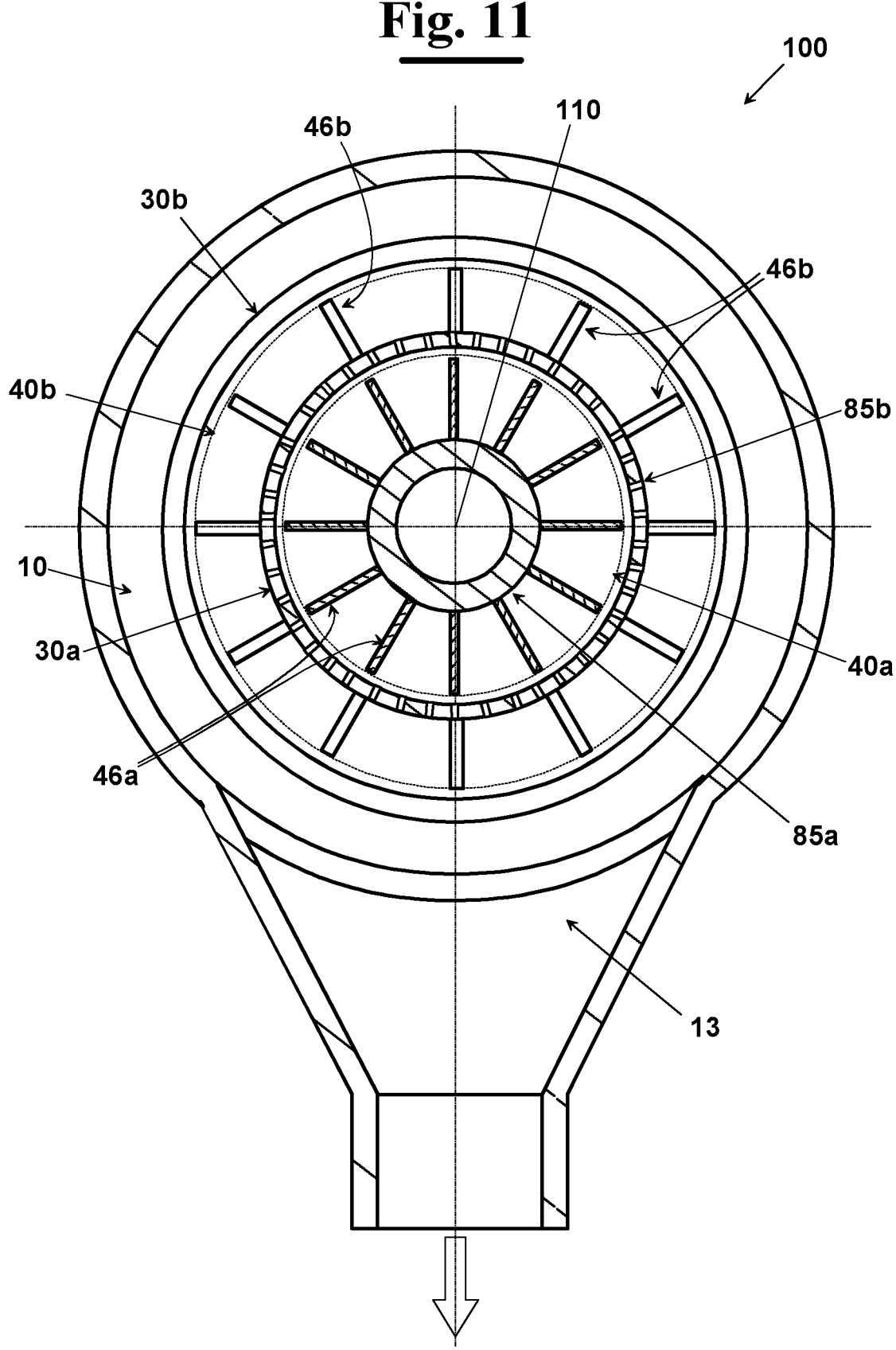
Figure 12:
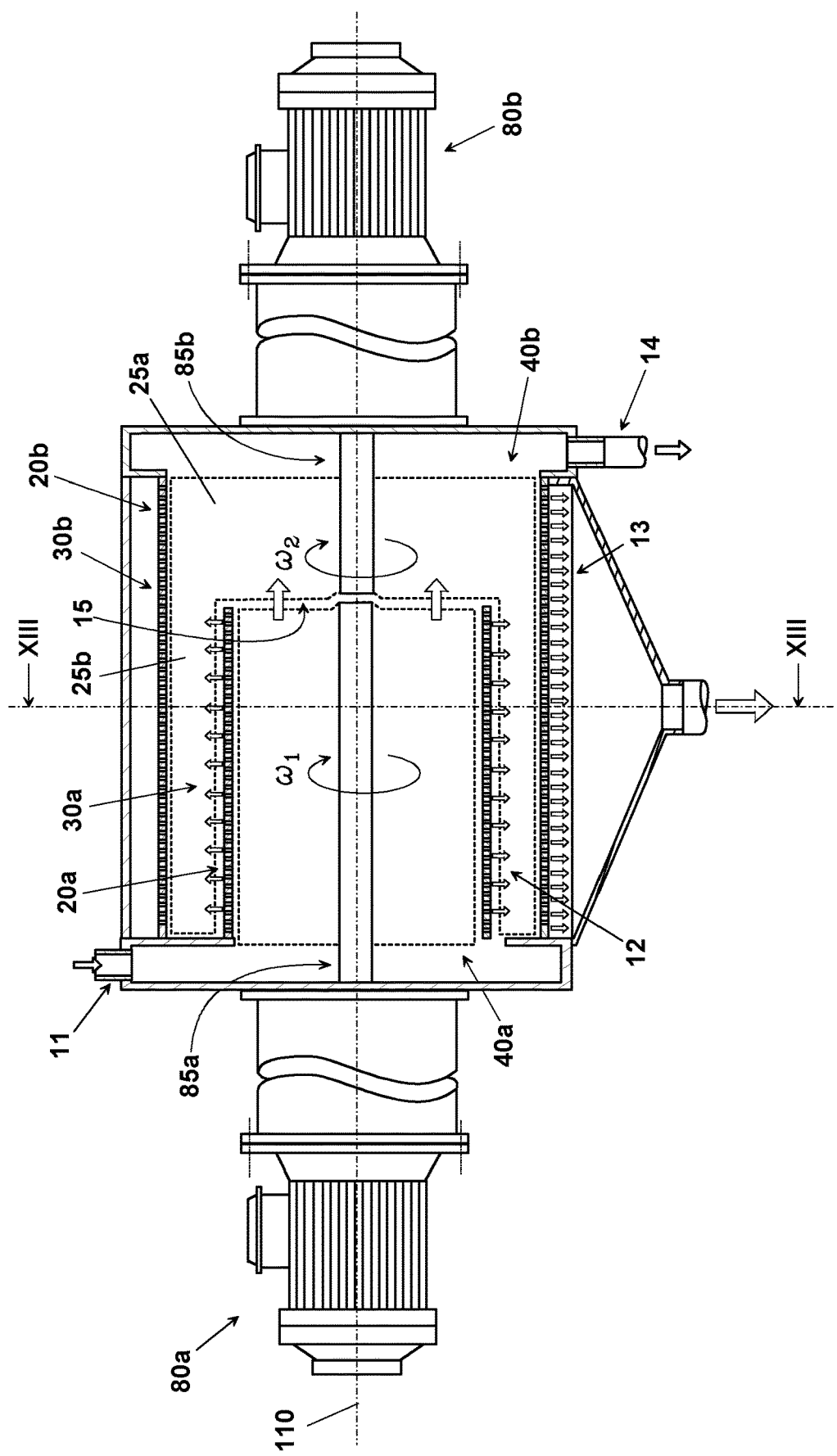
Figure 13:
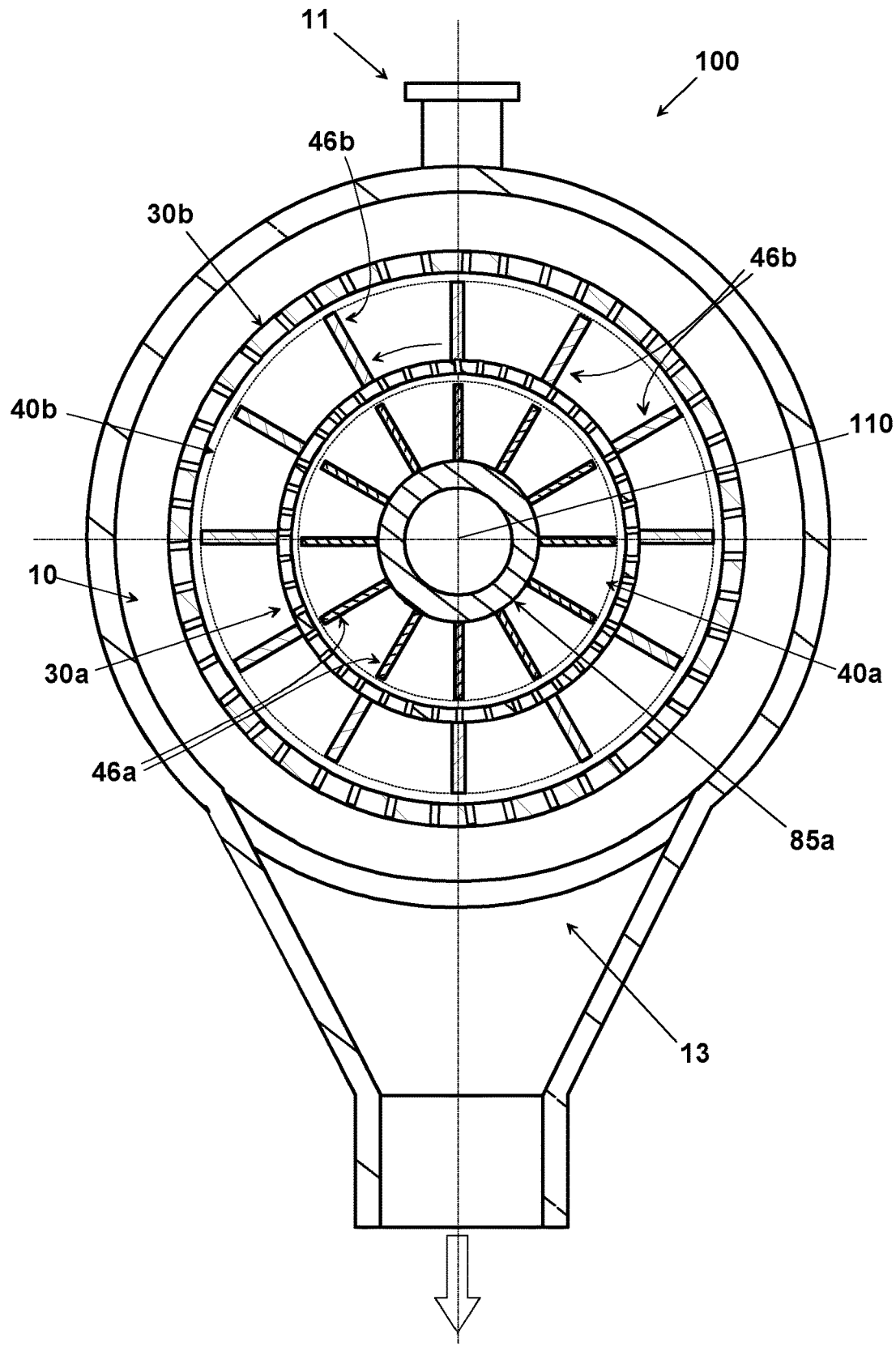

FIGS. from 7 to 9 diagrammatically show an elevational side view partially sectioned of still other alternative embodiments of the machine for extracting puree and juice from a product of vegetable origin of FIG. 1;

FIG. 10 diagrammatically shows a longitudinal sectioned view of another alternative embodiment of the machine for extracting puree and juice from a product of vegetable origin, according to the invention;

FIG. 11 diagrammatically shows a cross-section according to the arrows XI-XI of the machine of FIG. 10;

FIG. 12 diagrammatically shows a longitudinal section view of still another alternative embodiment of the machine for extracting puree and juice from a product of vegetable origin, according to the invention;

FIG. 13 diagrammatically shows a cross-section according to the arrows XIII-XIII of the machine of FIG. 12.

DETAILED DESCRIPTION OF SOME EXEMPLARY EMBODIMENTS OF THE INVENTION

Figure 1A:
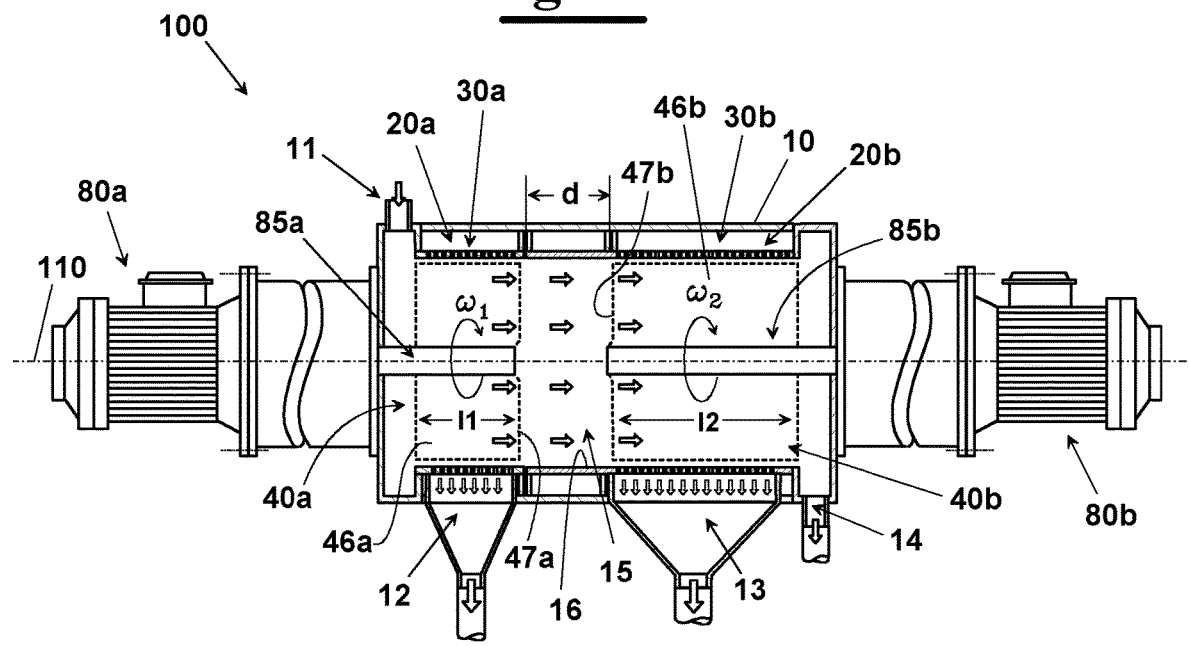
FIG. 1A diagrammatically shows an elevational side view partially sectioned of a first embodiment of a machine, according to the invention, for extracting puree and juice from a food product of vegetable origin.
Figure 1B:
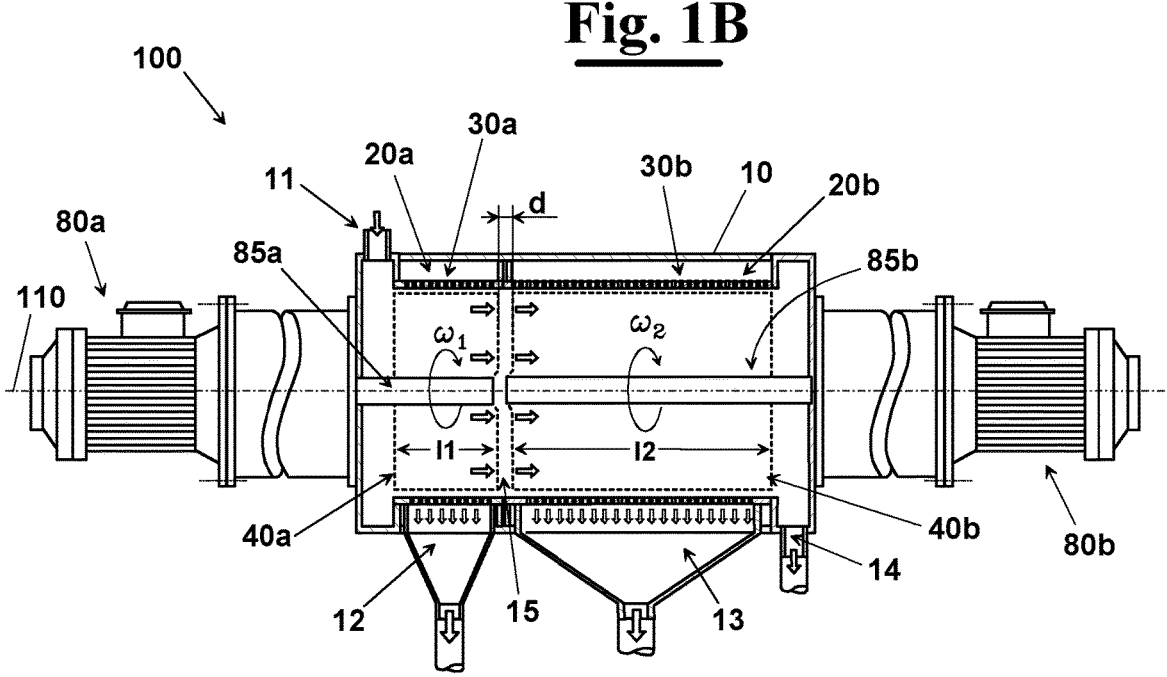
FIG. 1B diagrammatically shows an elevational side view partially sectioned of a first alternative embodiment per the machine of FIG. 1A.

In the FIGS. 1A and 1B, two different embodiments of a machine 100, according to the invention, are shown, as an example, of a machine for extracting puree, or juice, from a food product of vegetable origin. In both the cases, the machine 100 comprises a hollow body 10 having a longitudinal axis 110, and an inlet 11 for introducing the food product of vegetable origin. Inside the hollow body 10 a first and a second extraction sections 20a and 20b are provided comprising, respectively, a first and a second sieve 30a and 30b having a first and a second plurality of holes 35a and 35b. More in detail, in the first and second extraction sections 20a and 20b, a first and a second rotor 40a, 40b are, respectively, provided coaxially positioned within the first and the second sieve 30a and 30b and having a first and a second second plurality of blades 46a and 46b. A first and a second driving groups 80a and 80b are, furthermore, provided operatively connected, respectively, to the first and the second rotors 30a and 30b, by a first and a second motor shaft 85a and 85b. These are, advantageously, coaxially arranged one another. More precisely, the first and the second driving groups 80a and 80b are configured to cause, respectively, the first rotor 40a and the second rotor 40b to rotate within the first sieve 30a and the second sieve 30b. In this way, each rotor 40a and 40b applies a centrifugal force to the product positioned in the respective extraction section 20a and 20b. In particular, the first rotor 40a is arranged to apply the aforementioned centrifugal force to the product to be treated in order to divide the same in a first portion, which passes through the first sieve 30a and is discharged through a first outlet 12, and a second portion, which, instead, does not pass through the holes of the first sieve 30a and advance along the hollow body 10, along an axial direction, up to reach a passage section 15 and, from here, to be fed in the second extraction section 20b. Here, the second rotor 40b is arranged to apply a centrifugal force to the second portion of the product coming from the first extraction section 20a, in such a way to divide the same in a main product, which passes through the second sieve 30b and is discharged through a second outlet 13, and in a waste product, which, instead, does not pass through the second sieve 30b and is discharged through a third outlet 14.

According to a first aspect of the machine 100 of the invention, the first and the second rotors 40a and 40b can be configured in such a way that the first plurality of blades 46a of the first rotor 40a and the second plurality of blades 46b of the second rotor 40b are positioned at a predetermined distance d from each other less than 500 mm. In this way, the second portion of the product easily moves from the first extraction section 20a to the second extraction section 20b. In particular, the technical solution according to the invention allows, on the one hand, to avoid that the pit, or anyway the endocarp, that is the most internal portion of the fruit containing the seeds, can go between the two extraction sections, and precisely between the first rotor 40a and the second rotor 40b causing the jamming of the machine and thus requiring an extraordinary maintenance operation to remove the same and, on the other hand, that the pit can be broken going into the product "contaminating" the same. The aforementioned upper limit of the distance d allows to avoid the above described drawback also in the case of vegetable products having big pits as, for example, the mango, or other tropical fruits.

More in particular, the aforementioned distance d can be less than 400 mm, advantageously less than 300 mm, preferably less than 200 mm.

According to an embodiment of the invention, the aforementioned distance d can be greater than 0.4 mm. The aforementioned lower limit allows to avoid, on the one hand, that an interference between the blades 46a of the first rotor 40a and the blades 46b of the second rotor 40b can occur thus causing a premature wear of the same in particular at the opposite ends, and on the other hand, allows to avoid that in case of vegetable products having small seeds, as in the case of the apples, that the seeds can be broken and, therefore, can go into the main product "contaminating" the same and changing its organoleptic properties.

In particular, the first rotor 40*a* and the second rotor 40*b* can be configured to rotate in the same direction of rotation (see FIGS. 1A and 1B).

Figure 2:
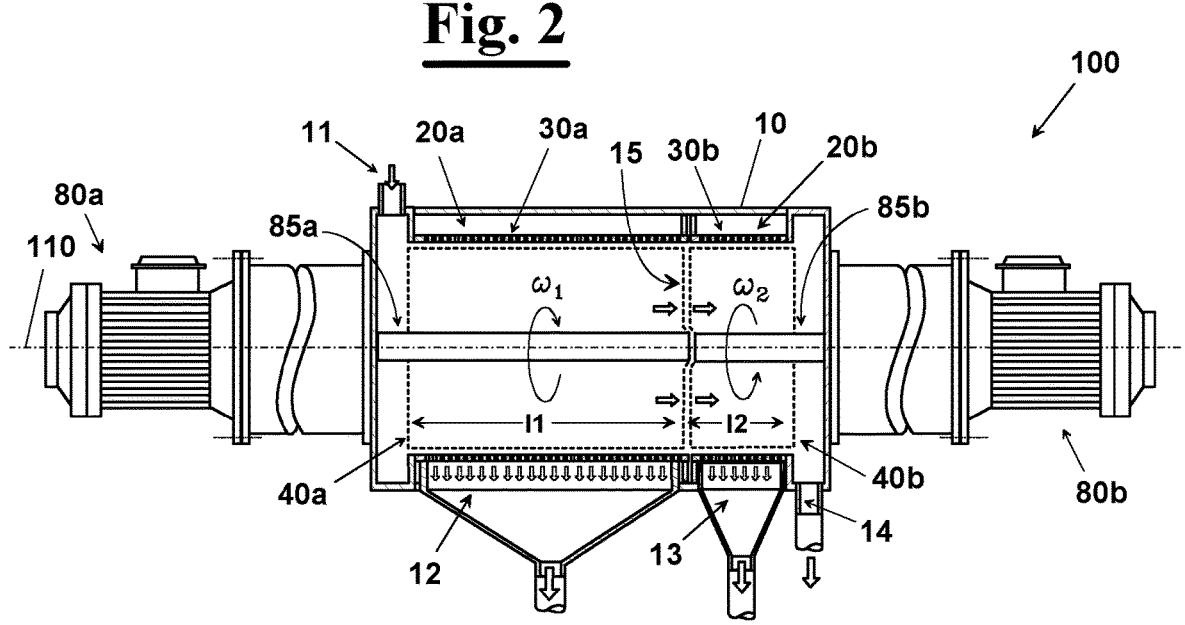
FIG. 2 diagrammatically shows an elevational side view partially sectioned of another alternative embodiment of the machine for extracting puree and juice from a product of vegetable origin of FIG. 1.

Alternatively, as diagrammatically shown in FIG. 2, the first rotor 40*a* and the second rotor 40*b* can be configured to rotate, respectively, in a first direction of rotation, and in a second direction of rotation opposite to the first direction of rotation.

Both in the embodiment of the machine 100 of FIG. 1A and in the embodiment of the machine 100 of FIG. 1B, the first extraction section 20*a* has a length 11 that is less than the length 12 of the second extraction section 20*b*.

Instead, in the alternative embodiment of FIG. 2, the length 11 of the first extraction section is greater than the length 12 of the second extraction section 20*b*. According to another aspect of the invention, the first sieve 30*a* can have a first diameter $\phi 1$ and the second sieve 30*b* a second diameter $\phi 2$ equal to the first diameter $\phi 1$, i.e. $\phi 2 = \phi 1$ (see FIGS. from 1 to 7).

Figure 8:
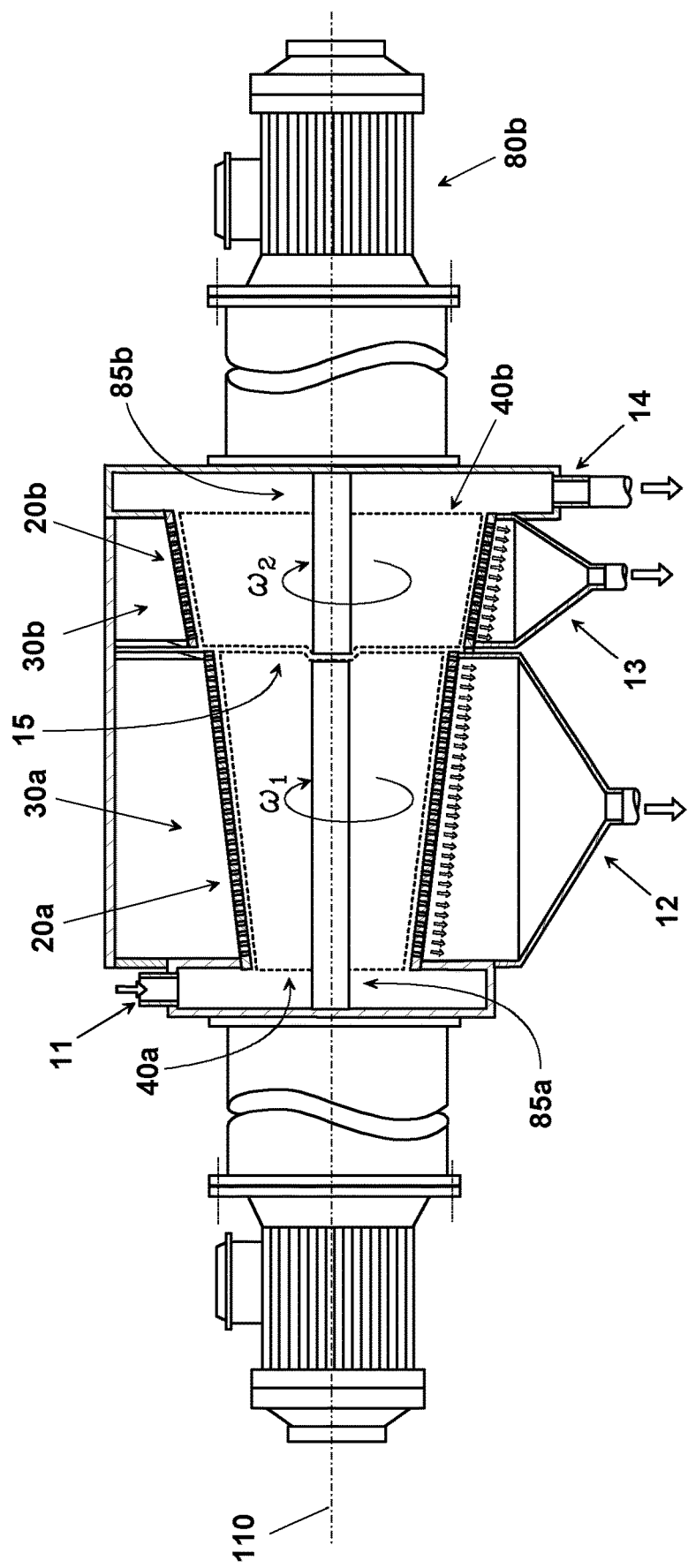

Alternatively, the second sieve 30*b* of the second extraction section can have a diameter $\phi 2$ greater than the diameter of the first sieve 30*a* of the first extraction section, i.e. $\phi 2 > \phi 1$ (see FIGS. 8, and from 10 to 11).

In particular, at least one between the first and the second sieve 30*a*, 30*b* can be conical-shaped. For example, in the case shown in FIG. 8, both the first sieve 30*a* and the second sieve 30*b* as well as the respective rotors 40*a*, and 40*b*, are substantially conical-shaped. In this case, the first sieve 30*a* has, advantageously, a first diameter $\phi 1a$ at the extraction section 20*a* that is closer to the inlet 11 and a second diameter $\phi 1b$ at the discharge of the second portion of the product in the second extraction section 20*b*, with $\phi 1a < \phi 1b$. Analogously, the second sieve 30*b* has a first diameter $\phi 2a$ at the feeding zone 15 of the second portion of product from the first extraction section 20*a* to the second extraction section 20*b*, and a second diameter $\phi 2b$ at the discharge zone of the waste product from machine 100, i.e. at the outlet 14, with $\phi 2b > \phi 2a$. In this case, advantageously, the second diameter $\phi 1b$ of the first sieve 30*a* at the discharge zone, can be less than the first diameter $\phi 2a$ of the second sieve 30*b* at the feeding zone, i.e. $\phi 1b < \phi 2a$. According to an alternative embodiment, analogously to the case above described with reference to the FIGS. from 1 to 7, the second diameter $\phi 1b$ of the first extraction section can be equal to the first diameter $\phi 2a$ of the second sieve 30*b*.

Advantageously, the first rotor 40*a* can be arranged to rotate at a first speed of rotation $\omega 1$ and the second rotor 40*b* can be arranged to rotate at a second speed of rotation $\omega 2$ greater than the first speed of rotation, i.e. $\omega 2 > \omega 1$. In this way, the second portion of the product moves easily from the first plurality of blades 46*a* to the second plurality of blades 46*b* thus assuring the integrity of the product during the passage of the second portion of product from the first extraction section 20*a* to the second extraction section 20*b*.

However, the possibility is also provided that the first speed of rotation $\omega 1$ is higher than the second speed of rotation $\omega 2$, i.e. $\omega 1 > \omega 2$. This technical solution is particularly advantageous when the machine 100 is arranged to process vegetable products having big pits in such a way to avoid to brake the same, but, at the same time, to remove all the pulp from the same and, therefore, to maximize the yield of the machine 100.

Advantageously, the passage section 15 is laterally delimited by a wall 16, which has no hole, in such a way to define a containing chamber for the second portion of the product, i.e. the pits and the skins, coming from the first extraction section 20*a* and directed towards the second extraction section 20*b*.

Figure 3:
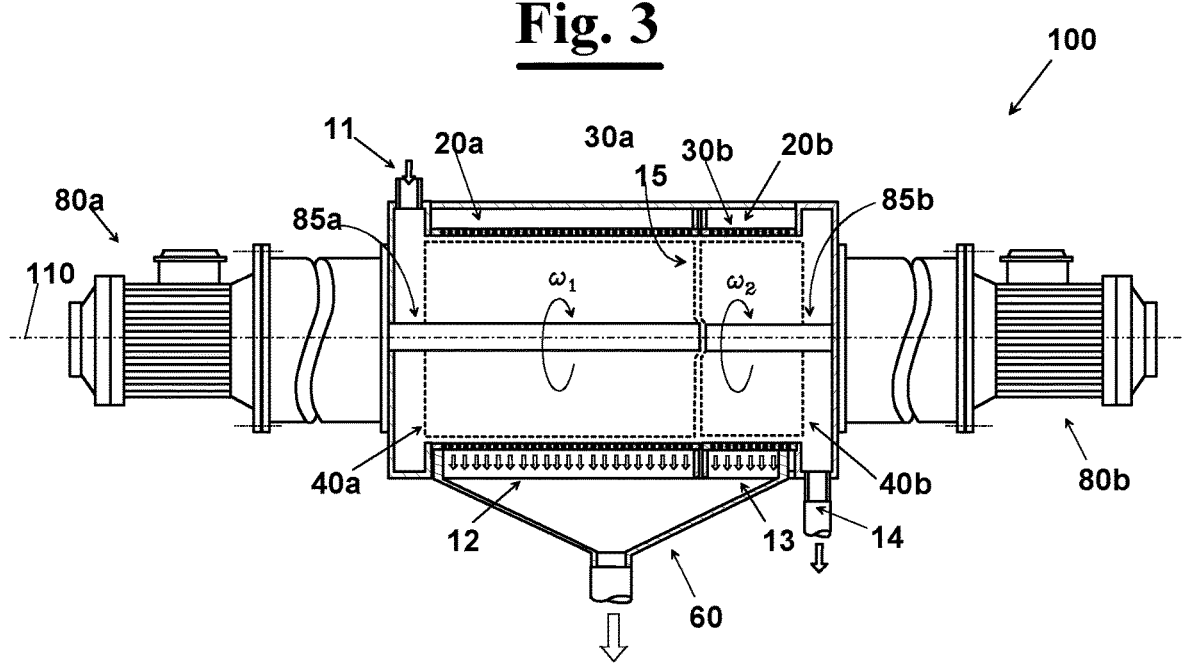
FIG. 3 diagrammatically shows an elevation side view partially sectioned of another alternative embodiment of the machine for extracting puree and juice from a product of vegetable origin of FIG. 1.

As diagrammatically shown in FIG. 3, according to an alternative embodiment, the first outlet 12 through which the first portion of the product extracted in the first extraction section 20*a* is discharged, and the second outlet 13 through which, instead, the main product extracted in the second extraction section 20*b* is discharged, can flow in the same discharge duct 60 in which, therefore, a mix of the two products occurs.

According to an embodiment of the invention, the first sieve 30*a* can have a first plurality of holes 35*a* having a first predetermined diameter d1, and the second sieve 30*b* can have a second plurality of holes 35*b* having a second predetermined diameter d2 different from d1, i.e. d1≠d2.

In particular, according to a first embodiment that is diagrammatically shown in FIGS. 5 and 6, the first diameter d1 of the holes 35*a* can be smaller than the second diameter d2 of the holes 35*b*. This embodiment can be, advantageously, adopted when a fine extraction has to be carried out in the first extraction section 20*a* and a rough extraction of the part of product that is closer to the endocarp, or pit, of the treated product, has to be carried out in the second extraction section 20*b*. In this case a very high quality of the final product and, anyway, a very high yield is obtained.

According to an alternative embodiment of the invention not shown in the figures for simplicity, the first diameter d1 of the holes 35*a* can be greater than the second diameter d2 of the holes 35*b*. For example, this embodiment of the invention can be advantageously adopted when a rough extraction has to be carried out in the first extraction section 30*a*, and in the second extraction section 30*b*, it is wished to extract from the product the part that is closest the tip of the treated product. Therefore, in this case a very high yield is obtained.

Figure 7:
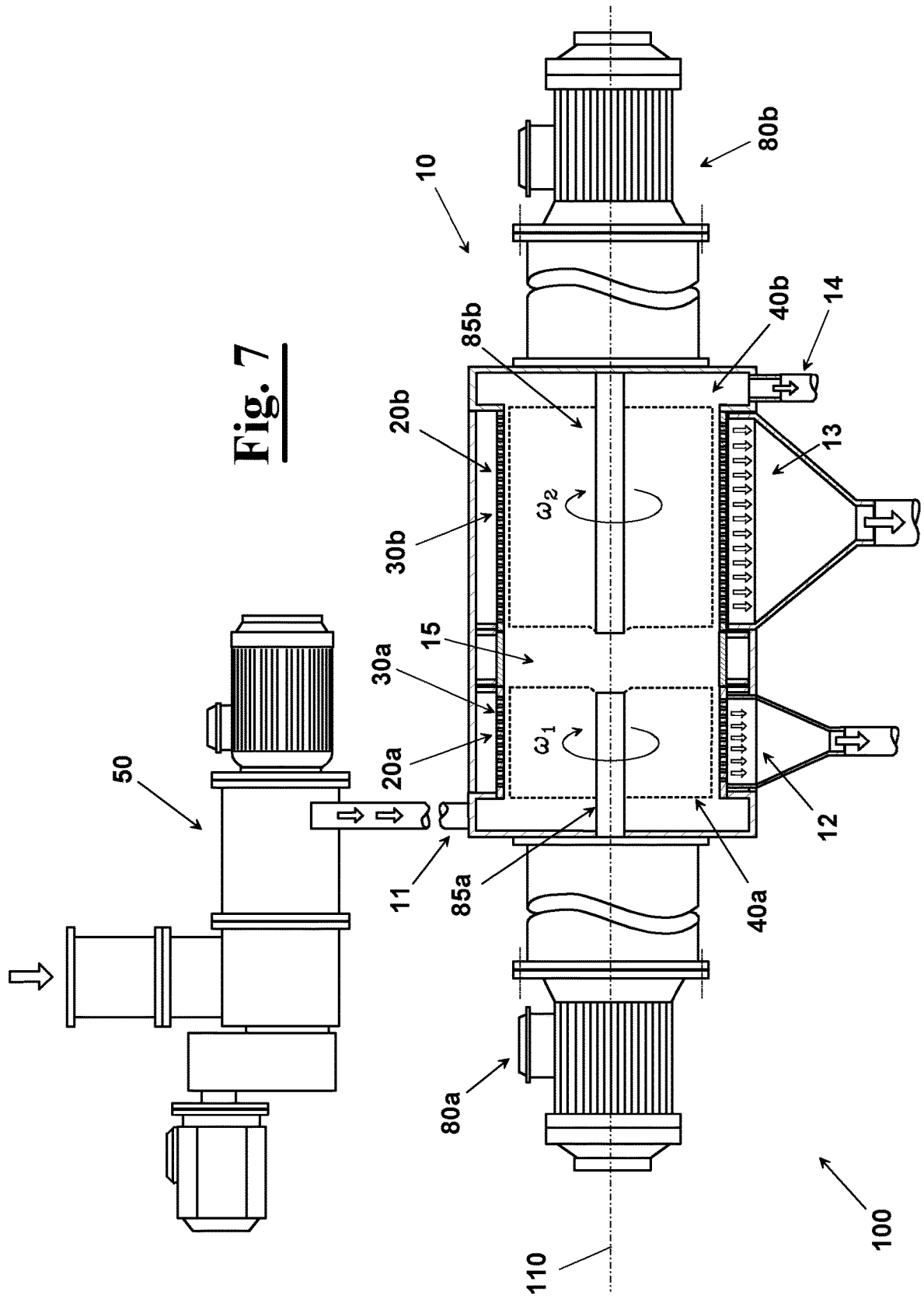

The machine 100 can be fed with the entire product, or, according to an alternative embodiment of the invention, diagrammatically shown in FIG. 7, upstream of the first extraction section 20*a*, a treatment section 50 can be provided configured to subject the starting food product of vegetable origin to a preliminary treatment. More in particular, the treatment section 50 can be a softening section, for example of the kind described in EP0511174 and comprising a cylindrical, or conical, rotor having blades and arranged to rotate within a fixed sieve of cylindrical, or conical, shape. More precisely, the rotor and the stator define two shaped walls having a series of protrusions and a series of recesses alternating to each other. The two walls delimit an interspace within which the product to be treated is subjected to a series of pulses in quick succession.

Alternatively, according to some embodiments of the invention not shown in the figures, the treatment section can be selected from the group comprising of: a grinding section, a chopping section, a cutting section, a section for dividing the stone from the product of vegetable origin, a section where the starting food product of vegetable origin is arranged to be forced to pass through the holes of a sieve, or a combination thereof.

Figure 9:
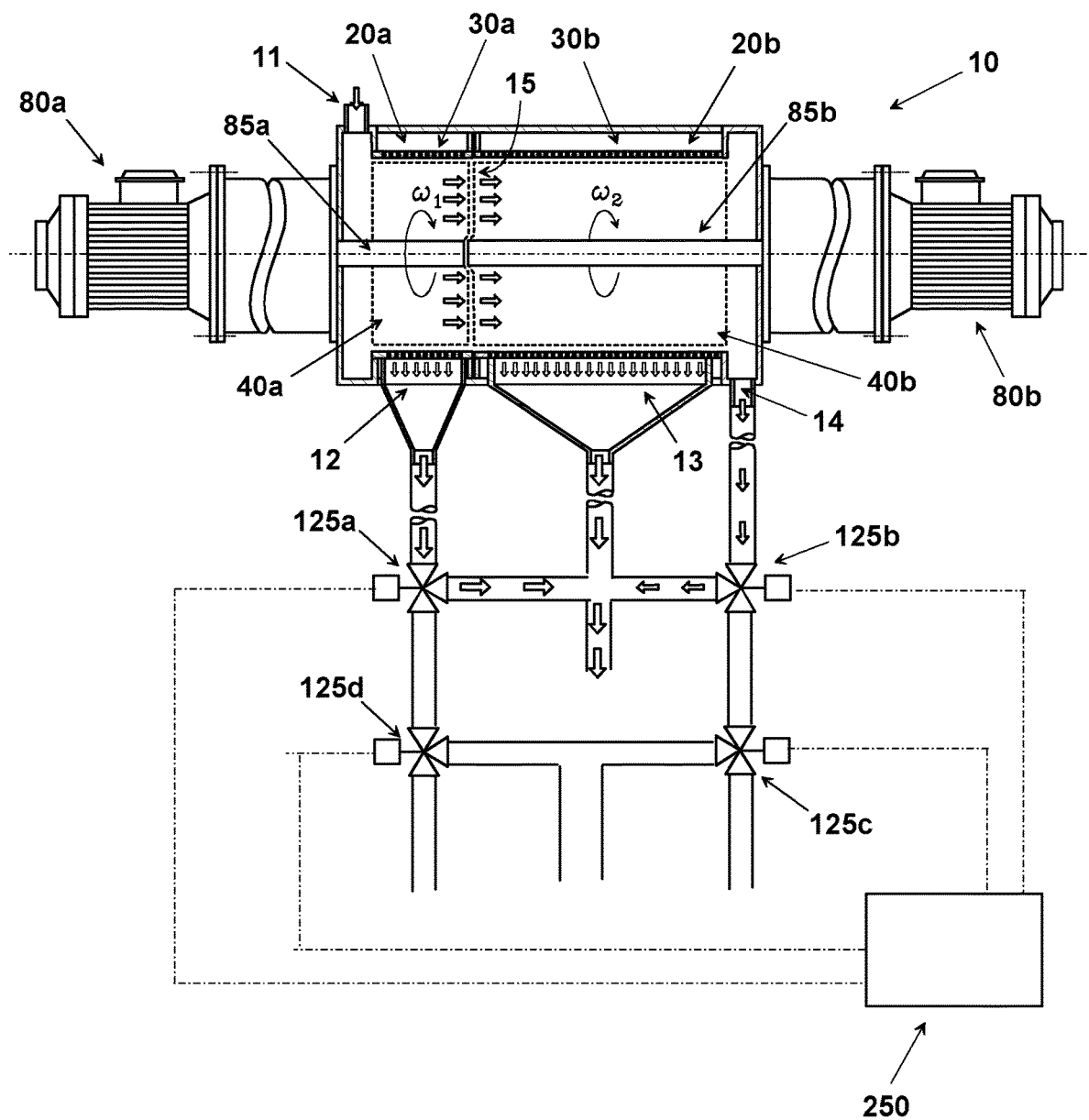

According to the further embodiment that is shown in FIG. 9, the machine 100 can provide a series of flow directing elements 125, for example 4 flow directing elements 125*a*-125*d*, configured in such a way that it is possible to select a determined mixing configuration among a plurality of different mixing configurations. More precisely, each directing element 125 can be arranged to be positioned between a first working position and a second working position, in order to direct respectively the flow of product that passes through them towards a first direction, or towards a second direction. In this way, the directing elements 125, advantageously operatively connected to an operative unit 250, allow to mix the first portion of the product obtained in the first extraction section 20a, with the main product obtained in the second extraction section 20b, and/or with the waste product obtained in the second extraction section 20b, or another possible combination.

According to another embodiment of the invention, the first extraction section 20a and the second extraction section 20b can be positioned, at least partially, one within the other.

In particular, the first extraction section 20a and the second extraction section 20b can be configured in such a way that the first portion of the product obtained in the first extraction section 20a, i.e. the portion that passes through the sieve 30a, moves from the first extraction section 20a to the passage section 15, and advantageously also in the second extraction section 20b, along a direction that is substantially radial to the hollow body 10. Instead, the second portion of the product, i.e. the portion that does not pass through the sieve 30a, moves from the first extraction section 20a to the passage section 15, and advantageously also to the second extraction section 20b, along a direction that is substantially longitudinal to the hollow body 10. More in particular, as diagrammatically shown in the FIGS. 12 and 13, the second extraction section 20b can comprise a base portion 25a mounted on the second motor shaft 85b and a protruding portion 25b arranged to longitudinally protrude from the base portion 25a. As shown in FIG. 12, the first extraction section 20a is, in this case, positioned within the protruding portion 25b of the second extraction section 20b.

In particular, according to the embodiment of FIGS. 12 and 13, the first sieve 20a can be fixed, or configured to rotate about said rotation axis 110. In this last case, the blades 46b of the second extraction section 20b, can be fixed to the sieve 30a of the first section 20a.

According to an alternative embodiment not shown in the figures, the machine 100 can provide an adjusting device configured to increase, or decrease, the distance d between the first plurality of blades and the second plurality of blades, i.e. between the first extraction section 20a and the second extraction section 20b. In this way, the machine 100 can be configured according to the treated vegetable product and in particular according to the pit size, or the endocarp, of the same. For example, the adjusting device can be configured to cause at least one between the first and the second plurality of blades to slide along the direction axial to the hollow body 10.

The foregoing description of a specific embodiment will so fully reveal the invention according to the conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

The invention claimed is:

1. Machine for extracting puree, or juice, from a food product of vegetable origin, said machine comprising:
    a hollow body having a longitudinal axis and an inlet for introducing said food product of vegetable origin, within said hollow body being provided:
    a first extraction section providing:
        a first sieve positioned into said hollow body and having a first plurality of holes;
        a first rotor coaxially positioned within said first sieve and having a first plurality of blades;
        a first driving group-operatively connected to said first rotor by a first motor shaft and configured to cause said first rotor to rotate within said first sieve to apply a centrifugal force to the product to be treated in order to divide said product to be treated in a first portion, which passes through said first plurality of said first sieve and is discharged through a first outlet and in a second portion, which, instead, does not pass through said first plurality of holes of said first sieve and advances along a direction axial to said hollow body up to reach a passage section;
    a second extraction section positioned downstream of said first extraction section and said passage section, said second extraction section being provided with:
        a second sieve positioned within said hollow body and having a second plurality of holes;
        a second rotor coaxially positioned within said second sieve and having a second plurality of blades;
        a second driving group operatively connected to said second rotor by a second motor shaft and configured to cause said second rotor to rotate within said second sieve to apply a centrifugal force to said second portion of said product coming from said first extraction section, in such a way to divide said second portion of said product in a main product, which passes through said second plurality of holes of said second sieve and is discharged through a second outlet and in a waste product, which, instead, does not pass through said second plurality of holes of said second sieve and is discharged through a third outlet;
    said machine being characterized in that said first plurality of blades of said first rotor and said second plurality of blades of said second rotor are positioned at a predetermined distance (d) from each other less than 500 mm, in such a way that said second portion of said product is arranged to move in said second extraction section without being deteriorated and, at the same time, without damaging the machine.

2. Machine, according to claim 1, wherein said predetermined distance (d) is less than 200 mm.

3. Machine, according to claim 1, wherein said predetermined distance (d) is greater than 0.4 mm.

4. Machine, according to claim 1, wherein said first sieve has a first diameter $\phi 1$ and said second sieve has a second diameter $\phi 2$, and wherein said second diameter $\phi 2$ is equal to, or greater than said first diameter $\phi 1$, i.e. $\phi 2 \geq \phi 1$.

5. Machine, according to claim 1, wherein said first rotor is arranged to rotate at a first speed of rotation $\omega 1$ and said second rotor is arranged to rotate at a second speed of rotation $\omega 2$, with $\omega 2 > \omega 1$, in such a way that said second portion of said product is arranged to move easily from a free end of said first plurality of blades to a free end of said second plurality of blades.

6. Machine, according to claim 1, wherein said first rotor is arranged to rotate at a first speed of rotation $\omega 1$ and said second rotor is arranged to rotate at a second speed of rotation ω2, with ω1>ω2, in such a way that said second portion of said product is arranged to move easily from a free end of said first plurality of blades to a free end of said second plurality of blades, but without being broken.

7. Machine, according to claim 1, wherein said first sieve—provides a first plurality of holes having a first predetermined diameter d1, and wherein said second sieve provides a second plurality of holes having a second predetermined diameter d2, and wherein d1>d2.

8. Machine, according to claim 1, wherein said first sieve provides a first plurality of holes having a first predetermined diameter d1, and wherein said second sieve provides a second plurality of holes having a second predetermined diameter d2, and wherein d1<d2.

9. Machine, according to claim 1, wherein a treatment section is provided positioned upstream of said first extraction section, said treatment section being configured to preliminary treat a starting food product of vegetable origin and being selected from the group comprising of:
   a softening section;
   a grinding section;
   a chopping section;
   a cutting section;
   a section for separating a stone from the product of vegetable origin;
   a section where said starting food product of vegetable origin is arranged to be forced to pass through the holes of a third sieve;
   or a combination thereof.

10. Machine according to claim 1 wherein said first extraction section and said second extraction section are positioned, at least partially, one within the other, and are configured in such a way that said first portion of said product moves from said first extraction section to said passage section along a direction that is substantially radial to said hollow body, and said second portion of said product moves from said first extraction section to said passage section along a direction that is substantially longitudinal to said hollow body.

11. Machine according to claim 10, wherein said second extraction section—comprises a base portion mounted on said second motor shaft and a protruding portion arranged to longitudinally protrude from said base portion, said first extraction section being positioned within said protruding portion of said second extraction section.

12. Machine according to claim 1 wherein flow directing elements are positioned downstream of said first outlet, of said second outlet and of said third outlet, said flow directing elements being configured in such a way that a mixing configuration is obtained selected from the group comprising of:
   a first mixing configuration wherein said first portion of said food product of vegetable origin obtained in said first extraction section is arranged to be mixed with said main product obtained in said second extraction section;
   a second mixing configuration wherein said first portion of said food product of vegetable origin obtained in said first extraction section is arranged to be mixed with said waste product obtained in said second extraction section;
   a third mixing configuration wherein said first portion of said food product of vegetable origin obtained in said first extraction section is arranged to be mixed with said main product and with said waste product obtained in said second extraction section;
   or a combination thereof.

13. Machine according to claim 1 wherein said passage section is laterally delimited by a wall, which does not have holes, in such a way to define a containing chamber for said second portion of said product coming from said first extraction section and directed towards said second extraction section.

14. Machine according to claim 1 wherein an adjusting device is provided configured to increase, or decrease, said distance (d) between said first plurality of blades of said first rotor and said second plurality of blades of said second rotor.

15. Method for extracting puree, or juice, from a food product of vegetable origin, said method comprising the steps of:
   feeding said food product of vegetable origin into a hollow body of a machine for extracting puree or juice through an inlet of said hollow body;
   extracting said food product of vegetable origin in a first extraction section—provided within said hollow body obtaining a first portion of said product and a second portion of said product, in said first extraction section being provided:
      a first sieve having a first plurality of holes;
      a first rotor coaxially positioned within said first sieve and having a first plurality of blades;
      a first driving group operatively connected to said first rotor by a first motor shaft and configured to cause said first rotor to rotate within said first sieve to apply a centrifugal force to the product to be treated in order to divide said product to be treated in said first portion of said product which passes through said first plurality of holes of said first sieve and in said second portion of said product, which, instead, does not pass through said first plurality of holes of said first sieve;
   discharging said first portion of said product through a first outlet of said hollow body;
   advancing of said second portion of said product along a direction axial to said hollow body up to reach a passage section positioned downstream of said first extraction section;
   feeding said second portion of said product along an axial direction into a second extraction section,
   the second extraction section being positioned downstream of said first extraction section and of said passage section, within said second extraction section being provided:
      a second sieve having a second plurality of holes;
      a second rotor coaxially positioned within said second sieve and having a second plurality of blades;
      a second driving group operatively connected to said second rotor by a second motor shaft and configured to cause said second rotor to rotate within said second sieve to apply a centrifugal force to the second portion of said product coming from said first extraction section, in such a way to divide said second portion of said product in a main product, which passes through said second plurality of holes of said second sieve and in a waste product, which, instead, does not pass through said second plurality of holes of said second sieve;
   extracting said second portion of said product in said second extraction section obtaining a main product and a waste product;
   discharging said main product through a second outlet;
   discharging said waste product through a third outlet;
said method being characterized in that said first plurality of blades of said first rotor and said second plurality of blades of said second rotor are positioned at a predetermined distance (d) from each other less than 500 mm, in such a way that said second portion of said product is arranged to move in said second extraction section without being deteriorated and, at the same time, without damaging the machine.

16. Method according to claim 15, wherein a directing step is, furthermore, provided for directing the flow of product obtained in said first and second extraction sections, in such a way to obtain a mixing selected from the group comprising of:
- mixing said first portion of said food product of vegetable origin obtained in said first extraction section with said main product obtained in said second extraction section;
- mixing said first portion of said food product of vegetable origin obtained in said first extraction section with said waste product obtained in said second extraction section;
- mixing said first portion of said food product of vegetable origin obtained in said first extraction section, with said main product and said waste product obtained in said second extraction section;
- or a combination thereof.

* * * * *